United States Patent
Kuwabara

(10) Patent No.: US 8,692,938 B2
(45) Date of Patent: Apr. 8, 2014

(54) VIDEO PROCESSING DEVICE AND VIDEO DISPLAY DEVICE USING SAME, AND SYNCHRONIZATION SIGNAL OUTPUT METHOD

(75) Inventor: Takashi Kuwabara, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/985,622

(22) PCT Filed: Feb. 8, 2012

(86) PCT No.: PCT/JP2012/000819
§ 371 (c)(1),
(2), (4) Date: Aug. 15, 2013

(87) PCT Pub. No.: WO2012/120780
PCT Pub. Date: Sep. 13, 2012

(65) Prior Publication Data
US 2013/0335630 A1    Dec. 19, 2013

(30) Foreign Application Priority Data
Mar. 10, 2011 (JP) .................................. 2011-052934

(51) Int. Cl.
*H04N 5/10* (2006.01)

(52) U.S. Cl.
USPC ........... 348/529; 348/547; 348/500; 348/563; 348/521; 348/510; 348/628; 348/441; 348/425.4; 348/714; 348/715; 348/718; 348/719; 348/721; 348/737; 348/528; 348/584; 348/705; 348/706; 348/731; 375/240.26; 375/240.28; 375/293

(58) Field of Classification Search
USPC ......... 348/529, 547, 500, 563, 521, 510, 528, 348/584, 628, 714, 705, 706, 719, 737, 731, 348/715, 718, 721, 441, 425.4; 375/240.26, 375/240.28, 293
See application file for complete search history.

(56) References Cited

U.S. PATENT DOCUMENTS 5,117,286 A * 5/1992 Jeong .......................... 348/14.12
5,177,619 A * 1/1993 Sato .............................. 386/279

(Continued)

FOREIGN PATENT DOCUMENTS

JP      11-341303 A    12/1999
JP    2001-285669 A    10/2001

(Continued)

OTHER PUBLICATIONS

International Search Report for Application No. PCT/JP2012/000819, dated Apr. 17, 2012.

*Primary Examiner* — Jefferey Harold
*Assistant Examiner* — Mustafizur Rahman
(74) *Attorney, Agent, or Firm* — RatnerPrestia

(57) ABSTRACT

There is provided a video processing device capable of reducing the influence of a disturbance of an input vertical synchronization signal. When the synchronization signal detecting unit detects an input of the input-side vertical synchronization signal at a predetermined cycle, the synchronization signal control unit outputs the input-side vertical synchronization signal, which has been input, as an output-side vertical synchronization signal, and, when the synchronization signal detecting unit detects an input of a next input-side vertical synchronization signal before the predetermined cycle elapses after the output of the output-side vertical synchronization signal, a next input-side vertical synchronization signal input before the predetermined cycle elapses is not output as a next output-side vertical synchronization signal, and an input-side vertical synchronization signal input further next is output as the next output-side vertical synchronization signal.

11 Claims, 12 Drawing Sheets

(56) References Cited

U.S. PATENT DOCUMENTS

| | | | |
|---|---|---|---|
| 5,561,650 A * | 10/1996 | Yamagishi | 386/341 |
| 5,751,374 A * | 5/1998 | Ninomiya et al. | 348/571 |
| 6,473,134 B1 * | 10/2002 | Nohara et al. | 348/614 |
| 6,549,905 B1 * | 4/2003 | Kim et al. | 707/770 |
| 6,633,339 B1 * | 10/2003 | Goto et al. | 348/425.4 |
| 7,450,135 B2 * | 11/2008 | Kim | 345/593 |
| 7,508,995 B2 * | 3/2009 | Schmidt | 382/276 |
| 7,868,862 B2 * | 1/2011 | Lee et al. | 345/88 |
| 7,969,507 B2 * | 6/2011 | Kim | 348/537 |
| 8,239,384 B2 * | 8/2012 | Kim et al. | 707/736 |
| 2003/0122963 A1 * | 7/2003 | Kim et al. | 348/468 |
| 2004/0017367 A1 * | 1/2004 | Kim | 345/214 |
| 2007/0097263 A1 * | 5/2007 | Kim | 348/521 |
| 2011/0007215 A1 * | 1/2011 | Hori et al. | 348/510 |
| 2011/0019090 A1 | 1/2011 | Nagatani | |

FOREIGN PATENT DOCUMENTS

| | | |
|---|---|---|
| JP | 2004-235715 A | 8/2004 |
| JP | 2011-004107 A | 1/2011 |
| WO | WO 2009/122702 A1 | 11/2009 |

* cited by examiner

VIDEO PROCESSING DEVICE AND VIDEO DISPLAY DEVICE USING SAME, AND SYNCHRONIZATION SIGNAL OUTPUT METHOD

RELATED APPLICATION

This application is a U.S. national phase application of PCT International Application PCT/JP2012/000819, filed Feb. 8, 2012, which claims the benefit of Japanese Patent Application No. 2011-052934, filed on Mar. 10, 2011, and the entire disclosures of which are incorporated herein by reference.

TECHNICAL FIELD

The present invention relates to an video processing device, and more particularly, to a video processing device that performs communication for controlling a video display or video processing by using a vertical synchronization signal input together with video data.

BACKGROUND ART

In video display devices such as television receivers, it is known that a synchronization signal, which is used for displaying a video on a display, is used as an operation reference signal used for performing video processing. However, there are cases where the synchronization signal is disturbed due to switching between video input sources (for example, switching between an input from a recording medium reproducing device and an input from a TV tuner), switching between resolutions, switching between video modes (switching between the NTSC mode and the PAL mode), or the like. When such a disturbance of the synchronization signal occurs, the video processing is not appropriately performed, whereby the display on the display device is disturbed as well.

In addition, while there are video display devices in which control data used for controlling video processing in a video processing unit is acquired from a microcomputer and is used for the video processing, in such a case, communication is performed between a video processing IC and the microcomputer by generating a communication timing signal using a video synchronization signal, and accordingly, there is a problem in that the communication with the microcomputer becomes unstable as the synchronization signal is disturbed. Regarding this problem, video processing devices are proposed which are capable of performing communication for reliably controlling video processing by detecting no-input of a video signal and generating the communication timing signal in a self-operative manner even in a case where a video signal is not input (for example, see Patent Literature 1).

CITATION LIST

Patent Literature

Patent Literature 1: JP 2011-4107 A

SUMMARY OF INVENTION

Technical Problem

However, in the above-described conventional video processing devices, while input/no-input of a video signal is determined by detecting an input video signal, and the communication with the microcomputer is continued by reflecting the result thereof, a certain time is necessary for detecting presence/no-presence of a video signal, and accordingly, right after a video signal has not been input or right after a change from a steady state to an abnormal input state, there is a problem in that a self-operative communication timing signal is not generated, and the communication with the microcomputer is disturbed.

FIG. 12 is a timing diagram that illustrates the relation between an input vertical synchronization signal and an output communication timing signal according to the above-described conventional video processing device. FIG. 12 illustrates an example in which the communication timing signal falls at the same timing as that of the input-side vertical synchronization signal. In FIG. 12, "INPERR" is an input error signal, that is, a signal output from a microcomputer in a case where the disturbance of the input is recognized by the microcomputer. The microcomputer predicts a cycle in which an input error is present and allows the input error signal to fall.

In FIG. 12, in a case where a video signal is normally input, the communication timing signal is generated based on the vertical synchronization signal of the video, and the communication timing signal falls at the same cycle as that of the vertical synchronization signal of the video. At this time, while a self-operative vertical synchronization signal is generated at timing that is regardless of the input vertical synchronization signal, the self-operative vertical synchronization signal is not used for generating the communication timing signal.

When the input video signal is disturbed at time t1, the video processing device waits for the fall of the input vertical synchronization signal, and when time-out occurs at time t2, the video processing device generates a communication timing signal by using the self-operative vertical synchronization signal from then. Then, the self operation is continued until the input error signal falls, and, when the input error signal falls at time t3, the video processing device waits for the fall of the self-operative vertical synchronization signal, and when the self-operative vertical synchronization signal falls at time t4, the video processing device generates a communication timing signal using the re-input vertical synchronization signal without using the fall. At time t5, since the vertical synchronization signal falls, the communication timing signal falls in accordance therewith.

As is apparent from FIG. 12, between time t1 when the input video signal starts to be disturbed and time t2 when the disturbance is detected, the communication timing signal is also disturbed in accordance with the disturbance of the input video signal.

An interval between time t1 when the input video signal starts to be disturbed and time t2 when the disturbance is detected is a time until an input error signal is output after the input video signal starts to be disturbed. In the above-described conventional video processing device, when the video signal starts to be distributed at time t1, the vertical synchronization signal is delivered from a video inputting unit to a microcomputer through a video detecting unit, a communication timing generating unit, and a communication control unit, the vertical synchronization signal is detected by the microcomputer through an interrupt, and the input error signal starts at time t2, whereby there is a time loss of "time t2−time t1" for notifying the video processing IC of the disturbance of the video. As a result, between time t1 and time t2, as illustrated in FIG. 12, the video is disturbed.

In addition, even in a case where the vertical synchronization signal of the input video is disturbed, the above-described conventional video processing device does not perform a video display according to the self-operative vertical synchronization signal, and, in a case where the vertical synchronization signal of the input video is disturbed, the display is disturbed.

The present invention is contrived in consideration of the above-described problems, and an object thereof is to provide a video processing device capable of reducing the effect of the disturbance of an input vertical synchronization signal.

Solution to Problem

In order to solve the above-mentioned problems in the related art, according to an aspect of the present invention, there is provided a video processing device including: a video inputting unit that receives video data and an input-side vertical synchronization signal used for displaying the video data as inputs; a synchronization signal detecting unit that detects an input of the input-side vertical synchronization signal to the video inputting unit; and a synchronization signal control unit that outputs an output-side vertical synchronization signal based on a detection result acquired by the synchronization signal detecting unit, in which the synchronization signal control unit outputs the input-side vertical synchronization signal, which has been input, as the output-side vertical synchronization signal when the synchronization signal detecting unit detects an input of the input-side vertical synchronization signal at a predetermined cycle, and in which, when the synchronization signal detecting unit detects an input of the next input-side vertical synchronization signal before the predetermined cycle elapses after the output of the output-side vertical synchronization signal, the synchronization signal control unit does not output a next input-side vertical synchronization signal input before an elapse of the predetermined cycle as a next output-side vertical synchronization signal but outputs an input-side vertical synchronization signal that is input further next as the next output-side vertical synchronization signal.

According to another aspect of the present invention, there is provided a video processing device including: a video inputting unit that receives video data and an input-side vertical synchronization signal used for displaying the video data as inputs; a synchronization signal detecting unit that detects an input of the input-side vertical synchronization signal to the video inputting unit; and a synchronization signal control unit that outputs an output-side vertical synchronization signal based on a detection result acquired by the synchronization signal detecting unit, in which the synchronization signal control unit outputs the input-side vertical synchronization signal, which has been input, as the output-side vertical synchronization signal when the synchronization signal detecting unit detects an input of the input-side vertical synchronization signal at a predetermined cycle, and in which, when the synchronization signal detecting unit has not detected an input of a next input-side vertical synchronization signal even when the predetermined cycle is over after the output of the output-side vertical synchronization signal, the synchronization signal control unit outputs a next output-side vertical synchronization signal when the predetermined cycle is over.

According to still another aspect of the present invention, there is provided a video processing device including: a video inputting unit that receives video data and an input-side vertical synchronization signal used for displaying the video data as inputs; a synchronization signal detecting unit that detects an input of the input-side vertical synchronization signal to the video inputting unit; and a synchronization signal control unit that outputs an output-side vertical synchronization signal based on a detection result acquired by the synchronization signal detecting unit, in which the synchronization signal control unit outputs the input-side vertical synchronization signal, which has been input, as the output-side vertical synchronization signal when the synchronization signal detecting unit detects an input of the input-side vertical synchronization signal at a predetermined cycle, and in which the synchronization signal control unit does not output a next input-side vertical synchronization signal as a next output-side vertical synchronization signal when the synchronization signal detecting unit detects an input of the next input-side vertical synchronization signal before the predetermined cycle elapses after the output of the output-side vertical synchronization signal, the synchronization signal control unit, when the synchronization signal detecting unit detects an input of a further next input-side vertical synchronization signal before the predetermined cycle elapses after the output of the output-side vertical synchronization signal, does not output the next output-side vertical synchronization signal until the predetermined cycle elapses after the output of the output-side vertical synchronization signal regardless of an input of an input-side vertical synchronization signal after that, and the synchronization signal control unit outputs the next output-side vertical synchronization signal when the predetermined cycle elapses after the output of the output-side vertical synchronization signal.

According to an aspect of the present invention, there is provided a video display device having a configuration that includes the above-described video processing device further including a video processing unit and a display displaying display data generated by the video processing unit.

According to another aspect of the present invention, there is provided a video display device that further includes a microcomputer communicating with the communication control unit and transmitting control data used for controlling video processing in the video processing unit to the communication control unit.

According to an aspect of the present invention, there is provided a method of outputting a synchronization signal, the method including: inputting video data and an input-side vertical synchronization signal used for displaying the video data; detecting an input of the input-side vertical synchronization signal; outputting the input-side vertical synchronization signal, which has been input, as an output-side vertical synchronization signal when an input of the input-side vertical synchronization signal is detected at a predetermined cycle in the detecting of an input of the input-side vertical synchronization signal; not outputting a next input-side vertical synchronization signal as a next output-side vertical synchronization signal but outputting an input-side vertical synchronization signal that is input further next as the next output-side vertical synchronization signal when an input of the next input-side vertical synchronization signal is detected in the detecting of an input of the input-side vertical synchronization signal before the predetermined cycle elapses after the output of the output-side vertical synchronization signal; and outputting the next output-side vertical synchronization signal when the predetermined cycle is over in a case where an input of the input-side vertical synchronization signal is not detected even when the predetermined cycle is over after the output of the output-side vertical synchronization signal in the detecting of an input of the input-side vertical synchronization signal.

Advantageous Effects of Invention

According to the present invention, the effect of the disturbance of an input vertical synchronization signal can be reduced.

As described below, there is another aspect in the present invention. Thus, the disclosure of this invention is for purposes of providing a part of the present invention but not for purposes of limiting the scope of the invention that is described and claimed here.

DESCRIPTION OF EMBODIMENTS

Figure 1:
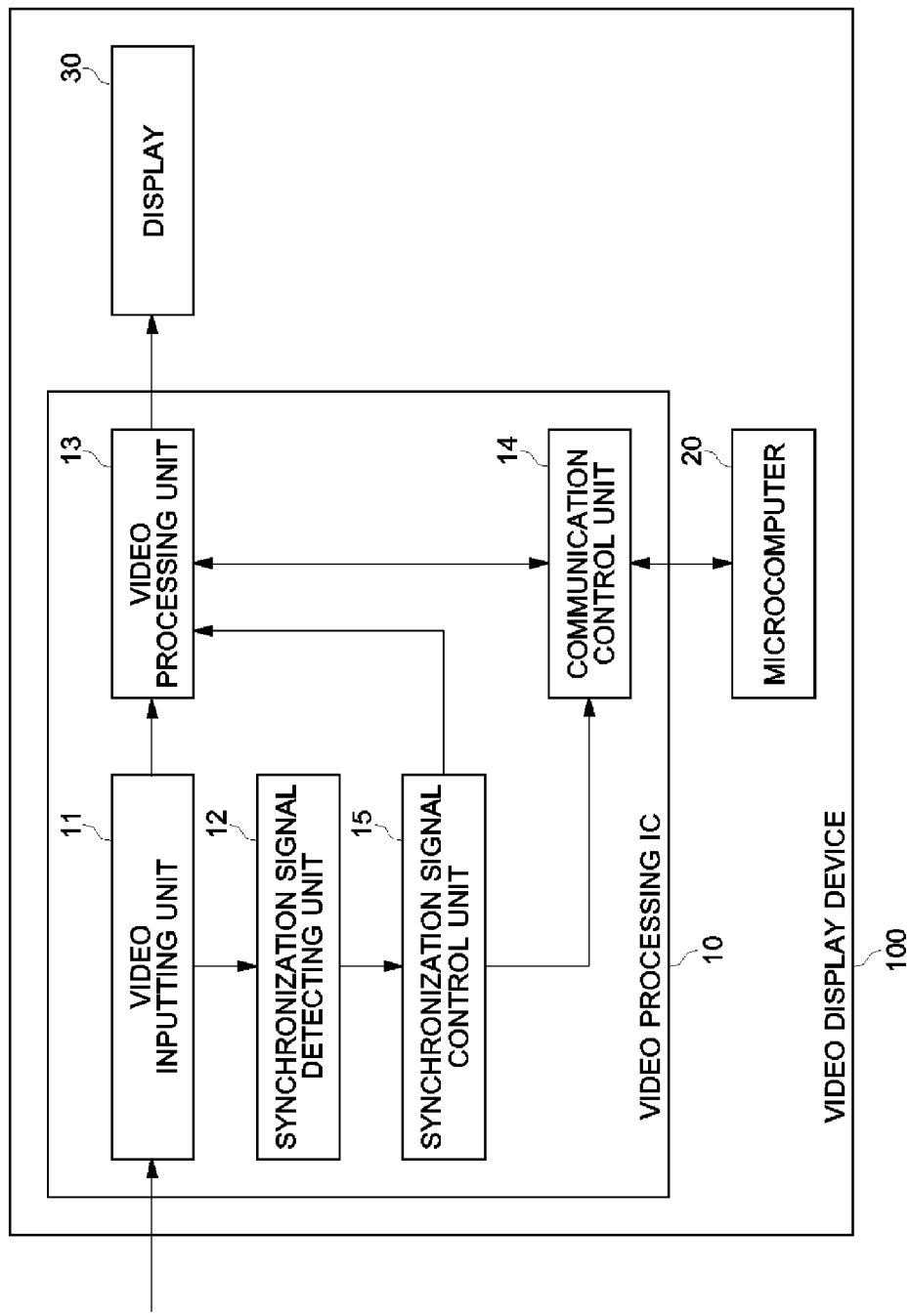
FIG. 1 is a block diagram that illustrates the configuration of a video processing device according to an embodiment of the present invention.

Hereinafter, detailed description of the present invention will be presented. Embodiments described below are merely examples of the present invention, and the present invention may be changed to various forms. Thus, specific configurations and specific functions disclosed below are not for purposes of limiting the claims.

According to an embodiment of the present invention, there is provided a video processing device including: a video inputting unit that receives video data and an input-side vertical synchronization signal used for displaying the video data as inputs; a synchronization signal detecting unit that detects an input of the input-side vertical synchronization signal to the video inputting unit; and a synchronization signal control unit that outputs an output-side vertical synchronization signal based on a detection result acquired by the synchronization signal detecting unit, wherein the synchronization signal control unit is configured to output the input-side vertical synchronization signal, which has been input, as the output-side vertical synchronization signal when the synchronization signal detecting unit detects an input of the input-side vertical synchronization signal at a predetermined cycle, and, when the synchronization signal detecting unit detects an input of the next input-side vertical synchronization signal before the predetermined cycle elapses after the output of the output-side vertical synchronization signal, the synchronization signal control unit is configured not to output a next input-side vertical synchronization signal input before an elapse of the predetermined cycle as a next output-side vertical synchronization signal but to output an input-side vertical synchronization signal that is input further next as the next output-side vertical synchronization signal.

According to such a configuration, in a case where the input-side vertical synchronization signal is input earlier than the original cycle, the input-side vertical synchronization signal is not directly output as an output-side vertical synchronization signal, waiting for an input of the next input-side vertical synchronization signal is performed, and then, the input-side vertical synchronization signal is output as an output-side vertical synchronization signal, and accordingly, a video can be prevented from being disturbed by outputting the output-side vertical synchronization signal in a video display period, whereby a video can be stably displayed, and the communication can be stabilized even in a case where the communication is performed using this output-side vertical synchronization signal.

In the above-described video processing device, when the synchronization signal detecting unit has not detected an input of the next input-side vertical synchronization signal even when the predetermined cycle is over after the output of the output-side vertical synchronization signal, the synchronization signal control unit may output the next output-side vertical synchronization signal when the predetermined cycle is over.

According to such a configuration, in a case where the next input-side vertical synchronization signal is not input even when the original cycle is over, since the synchronization signal control unit spontaneously generates and outputs the output-side vertical synchronization signal, a video can be stably displayed, and the communication can be stabilized in a case where the communication is performed using this output-side vertical synchronization signal.

According to another aspect, there is provided a video processing device including: a video inputting unit that receives video data and an input-side vertical synchronization signal used for displaying the video data as inputs; a synchronization signal detecting unit that detects an input of the input-side vertical synchronization signal to the video inputting unit; and a synchronization signal control unit that outputs an output-side vertical synchronization signal based on a detection result acquired by the synchronization signal detecting unit, wherein the synchronization signal control unit outputs the input-side vertical synchronization signal, which has been input, as the output-side vertical synchronization signal when the synchronization signal detecting unit detects an input of the input-side vertical synchronization signal at a predetermined cycle, and, when the synchronization signal detecting unit has not detected an input of a next input-side vertical synchronization signal even when the predetermined cycle is over after the output of the output-side vertical synchronization signal, the synchronization signal control unit outputs a next output-side vertical synchronization signal when the predetermined cycle is over.

According to such a configuration, in a case where the next input-side vertical synchronization signal is not input even when the original cycle is over, since the synchronization signal control unit spontaneously generates and outputs the output-side vertical synchronization signal, a video can be stably displayed, and the communication can be stabilized in a case where the communication is performed using this output-side vertical synchronization signal.

In the above-described video processing device, the synchronization signal control unit may not output the next input-side vertical synchronization signal as the next output-side vertical synchronization signal when the synchronization signal detecting unit detects an input of the next input-side vertical synchronization signal before the predetermined cycle elapses after the output of the output-side vertical synchronization signal, the synchronization signal control unit, when the synchronization signal detecting unit detects an input of a further next input-side vertical synchronization signal before the predetermined cycle elapses after the output of the output-side vertical synchronization signal, may not output the next output-side vertical synchronization signal until the predetermined cycle elapses after the output of the output-side vertical synchronization signal regardless of an input of an input-side vertical synchronization signal after that, and the synchronization signal control unit may output the next output-side vertical synchronization signal when the predetermined cycle elapses after the output of the output-side vertical synchronization signal.

According to such a configuration, in a case where the input of the input-side vertical synchronization signal is detected two or more times before a predetermined cycle elapses after the output of the output-side vertical synchronization signal due to a disturbance of the input-side vertical synchronization signal, the input-side vertical synchronization signal is ignored, and, when the predetermined cycle elapses after the output of the output-side vertical synchronization signal, the synchronization signal control unit spontaneously generates and outputs the output-side vertical synchronization signal, and accordingly, even in a case where the input-side vertical synchronization signal is disturbed, the video can be stably displayed, and the communication can be stabilized in a case where the communication is performed using this output-side vertical synchronization signal.

In addition, according to further another aspect, there is provided a video processing device including: a video inputting unit that receives video data and an input-side vertical synchronization signal used for displaying the video data as inputs; a synchronization signal detecting unit that detects an input of the input-side vertical synchronization signal to the video inputting unit; and a synchronization signal control unit that outputs an output-side vertical synchronization signal based on a detection result acquired by the synchronization signal detecting unit, wherein the synchronization signal control unit outputs the input-side vertical synchronization signal, which has been input, as the output-side vertical synchronization signal when the synchronization signal detecting unit detects an input of the input-side vertical synchronization signal at a predetermined cycle, and the synchronization signal control unit does not output a next input-side vertical synchronization signal as a next output-side vertical synchronization signal when the synchronization signal detecting unit detects an input of the next input-side vertical synchronization signal before the predetermined cycle elapses after the output of the output-side vertical synchronization signal, the synchronization signal control unit, when the synchronization signal detecting unit detects an input of a further next input-side vertical synchronization signal before the predetermined cycle elapses after the output of the output-side vertical synchronization signal, does not output the next output-side vertical synchronization signal until the predetermined cycle elapses after the output of the output-side vertical synchronization signal regardless of an input of an input-side vertical synchronization signal after that, and the synchronization signal control unit outputs the next output-side vertical synchronization signal when the predetermined cycle elapses after the output of the output-side vertical synchronization signal.

According to such a configuration, in a case where the input of the input-side vertical synchronization signal is detected two or more times before a predetermined cycle elapses after the output of the output-side vertical synchronization signal due to a disturbance of the input-side vertical synchronization signal, the input-side vertical synchronization signal is ignored, and, when the predetermined cycle elapses after the output of the output-side vertical synchronization signal, the synchronization signal control unit spontaneously generates and outputs the output-side vertical synchronization signal, and accordingly, even in a case where the input-side vertical synchronization signal is disturbed, the video can be stably displayed, and the communication can be stabilized in a case where the communication is performed using this output-side vertical synchronization signal.

The above-described video processing device is configured to further include a video processing unit that receives the video data input to the video inputting unit as an input and generates display data used for displaying the video data by processing the video data using the output-side vertical synchronization signal output from the synchronization signal control unit.

According to such a configuration, in a case where the input-side vertical synchronization signal is input earlier than the original cycle, a case where the input-side vertical synchronization signal has not been input even when the original cycle is over, and/or a case where the input-side vertical synchronization signal is disturbed, by processing video data using the output-side vertical synchronization signal output by the synchronization signal control unit, display data in which the disturbance of the display is reduced can be generated.

The above-described video processing device is configured to further include a communication control unit that performs communication used for controlling video processing in the video processing unit by using a communication timing signal that is based on the output-side vertical synchronization signal output from the synchronization signal control unit.

According to such a configuration, in a case where the input-side vertical synchronization signal is input earlier than the original cycle, a case where the input-side vertical synchronization signal has not been input even when the original cycle is over, and/or a case where the input-side vertical synchronization signal is disturbed, the communication according to the communication control unit can be stabilized by using a communication timing signal that is based on the output-side vertical synchronization signal output by the synchronization signal control unit.

According to an embodiment of the present invention, there is provided a video display device further including: the above-described video processing device that further includes a video processing unit; and a display that displays the display data generated by the video processing unit.

According to such a configuration, the influence of the disturbance of the input-side vertical synchronization signal on the video display can be reduced.

According to another aspect, there is provided a video display device having a configuration including a microcomputer that communicates with a communication control unit and transmits control data used for controlling video processing in a video processing unit to the communication control unit.

According to such a configuration, a control value used for the process in the video processing unit can be dynamically set in accordance with features of a video in the microcomputer, and, at this time, the influence of the disturbance of the input-side vertical synchronization signal on the communication between the video processing device and the microcomputer can be reduced.

According to an embodiment of the present invention, there is provided a method of outputting a synchronization signal including: inputting video data and an input-side vertical synchronization signal used for displaying the video data; detecting an input of the input-side vertical synchronization signal; outputting the input-side vertical synchronization signal, which has been input, as an output-side vertical synchronization signal when an input of the input-side vertical synchronization signal is detected at a predetermined cycle in the detecting of an input of the input-side vertical synchronization signal; not outputting a next input-side vertical synchronization signal as a next output-side vertical synchronization signal but outputting an input-side vertical synchronization signal that is input further next as the next output-side vertical synchronization signal when an input of the next input-side vertical synchronization signal is detected in the detecting of an input of the input-side vertical synchronization signal before the predetermined cycle elapses after the output of the output-side vertical synchronization signal; and outputting the next output-side vertical synchronization signal when the predetermined cycle is over in a case where an input of the input-side vertical synchronization signal is not detected even when the predetermined cycle is over after the output of the output-side vertical synchronization signal in the detecting of an input of the input-side vertical synchronization signal.

According also to such a configuration, in a case where the input-side vertical synchronization signal is input earlier than the original cycle, the input-side vertical synchronization signal is not directly output as an output-side vertical synchronization signal, waiting for an input of the next input-side vertical synchronization signal is performed, and then, the input-side vertical synchronization signal is output as an output-side vertical synchronization signal, and accordingly, a video can be prevented from being disturbed by outputting the output-side vertical synchronization signal in a video display period, and, in a case where the next input-side vertical synchronization signal is not input even when the original cycle is over, the synchronization signal control unit can spontaneously generate and output the output-side vertical synchronization signal. Accordingly, a video can be stably displayed, and the communication can be stabilized even in a case where the communication is performed using this output-side vertical synchronization signal.

Hereinafter, embodiments of the present invention will be described with reference to the drawings. In the embodiments of this specification, in a case where a signal transmits information by being low or high, and, this signal is input, falling of the signal from high to low may be represented as "inputting" the signal. In addition, in a case where a signal transmits information by being low or high, and, this signal is output, falling of the signal from high to low may be represented as "outputting" the signal. Alternatively, rising of the input signal from low to high may be represented as "inputting" the signal, and rising of the output signal from low to high may be represented as "outputting" the signal.

FIG. 1 is a block diagram that illustrates the configuration of a video processing device according to an embodiment of the present invention. A video display device 100 according to this embodiment includes a video processing IC 10, a microcomputer 20, and a display 30. The video processing IC 10 corresponds to a video processing device according to the present invention. The video processing IC 10 is an IC that performs various signal processing such as the adjustment of image quality for a video signal input from an external device such as a DVD player or a TV tuner and outputs display data used for displaying a video on the display 30. The video processing IC 10 includes a video inputting unit 11, a synchronization signal detecting unit 12, a video processing unit 13, a communication control unit 14, and a synchronization signal control unit 15.

The video inputting unit 11 receives a video signal of an analog form or a digital form. The video signal of each frame is input, and, in a video signal of one frame, video data corresponding to one frame and a vertical synchronization signal are included. Hereinafter, the vertical synchronization signal input to the video inputting unit 11 will be also referred to as an "input-side vertical synchronization signal". In a case where the input video signal is in the analog form, the video inputting unit 11 is an ADC (Analog-Digital Converter). On the other hand, in a case where the input video signal is a video signal of a serialized digital form such as HDMI, the video inputting unit 11 performs serial-to-parallel conversion. Of the video signal input to the video inputting unit 11, the video data is output to the video processing unit 13, and the input-side vertical synchronization signal is output to the synchronization signal detecting unit 12.

The synchronization signal detecting unit 12 detects whether or not an input-side vertical synchronization signal has been input by the video inputting unit 11. The video processing unit 13 performs various video signal processing for the video data input from the video inputting unit 11. The video processing unit 13 performs video signal processing using the vertical synchronization signal output from the synchronization signal control unit 15 as an operation reference signal. As the video signal processing, for example, there is contrast control for changing contrasting between white and black in the video, brightness control for changing the brightness of the whole screen, color gain control for changing the color density of the video, or the like. As a setting value used for performing such control, a value that is written into a register included in the communication control unit 14 is used.

The video processing performed by the video processing unit 13 may operate in accordance with a constant setting value regardless of the features of a video scene (static control), or the setting value may be dynamically changed in accordance with the features of a video scene, for example, for each frame (dynamic control).

Figure 2:
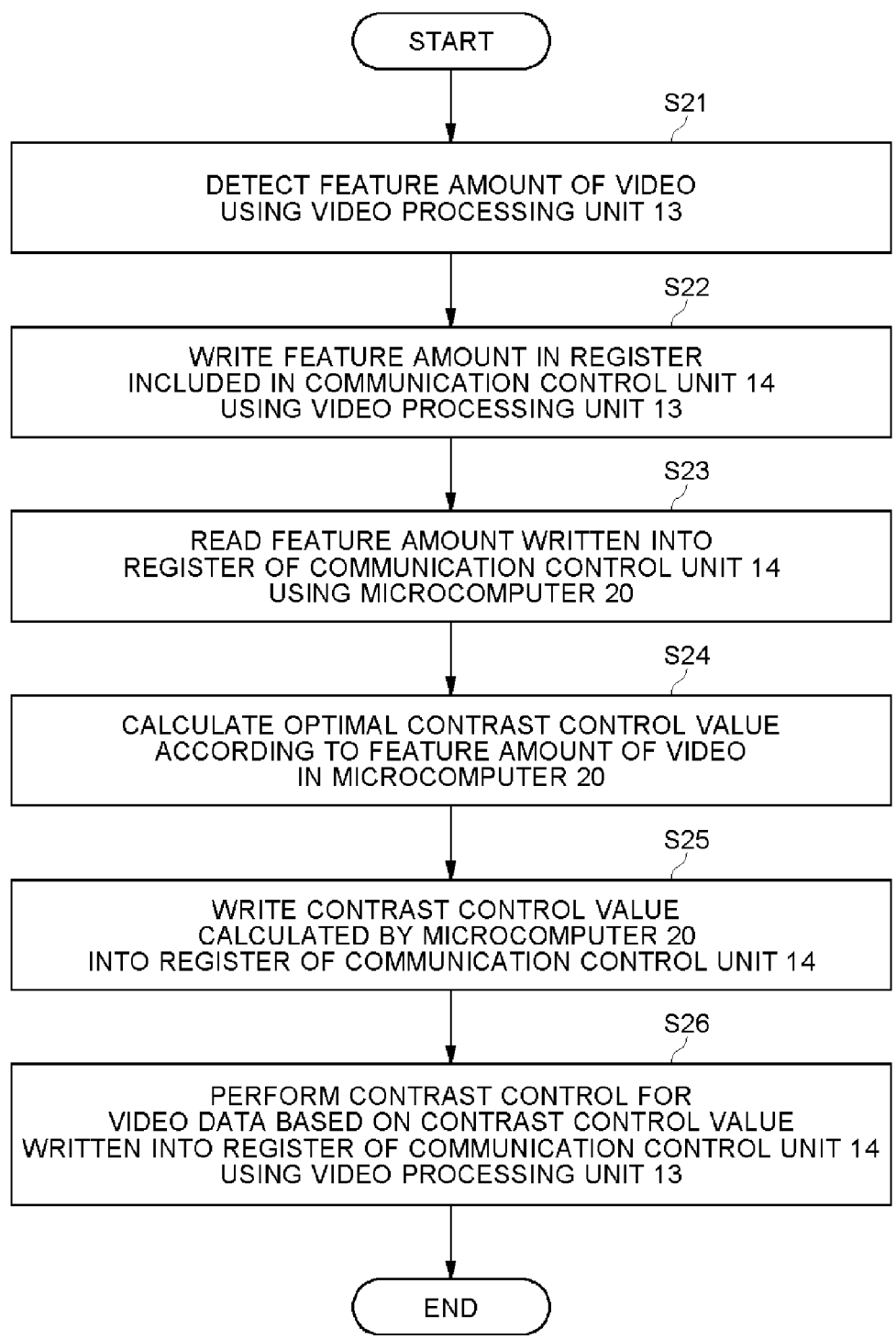
FIG. 2 is a flowchart that illustrates the process of dynamic control of a setting value of video processing according to an embodiment of the present invention.

FIG. 2 is a flowchart that illustrates the process of the dynamic control of the setting value. The dynamic control of the setting value is performed in the sequence illustrated in FIG. 2. Here, a case will be described in which the contrast is dynamically controlled in accordance with the features of a video.

First, the video processing unit 13 detects a feature amount of a video for a corresponding frame (Step S21). As the feature amount of the video, for example, there is maximum luminance/minimum luminance, average luminance, a luminance histogram, or the like of the video signal. Next, the video processing unit 13 writes the detected feature amount at a corresponding address in a register included in the communication control unit 14 (Step S22).

The microcomputer 20 reads the feature amount written into the register of the communication control unit 14 (Step S23) and calculates an optimal contrast control value in accordance with the feature amount of the video (Step S24). Then, the calculated contrast control value is written into a corresponding resister of the communication control unit 14 (Step S25). Then, the video processing unit 13 performs contrast control of the video data based on the contrast control value written into the register (Step S26).

By performing the above-described process for each frame, the contrast control can be dynamically performed, and accordingly, control can be performed for optimal contrast in accordance with the features of the video. The communication control unit 14 is connected to the microcomputer 20 and controls the communication with the microcomputer 20. The communication control unit 14 controls the communication with the microcomputer 20 by using the vertical synchronization signal output from the synchronization signal control unit 15 as a communication timing signal. The communication control unit 14 includes a register used for storing data, and data transmitted from the microcomputer 20 is stored at a corresponding address in the register. In addition, the microcomputer 20 can read data stored at a predetermined address of the register through the communication control unit 14.

The synchronization signal control unit 15 outputs the vertical synchronization signal to the video processing unit 13 and the communication control unit 14. Hereinafter, the vertical synchronization signal output by the synchronization signal control unit 15 is also referred to as an "output-side vertical synchronization signal". The process of outputting the output-side vertical synchronization signal that is performed by the synchronization signal control unit 15 will be described later.

The microcomputer 20 performs writing of the setting value of the video processing for the video processing IC 10 or reading of a video feature amount through the communication control unit 14. As the communication between the video processing IC 10 and the microcomputer 20, for example, serial communication such as I2C (Inter-Integrated Circuit) is used.

The display 30 is a device that displays display data supplied from the video processing IC 10 as a video and is configured by one or more selected from among a display such as a liquid crystal, a CRT (Cathode Ray Tube), an organic EL (Electro-Luminescence), or a plasma, a projector projecting a video on a screen, a head-up display, and the like.

Figure 3:
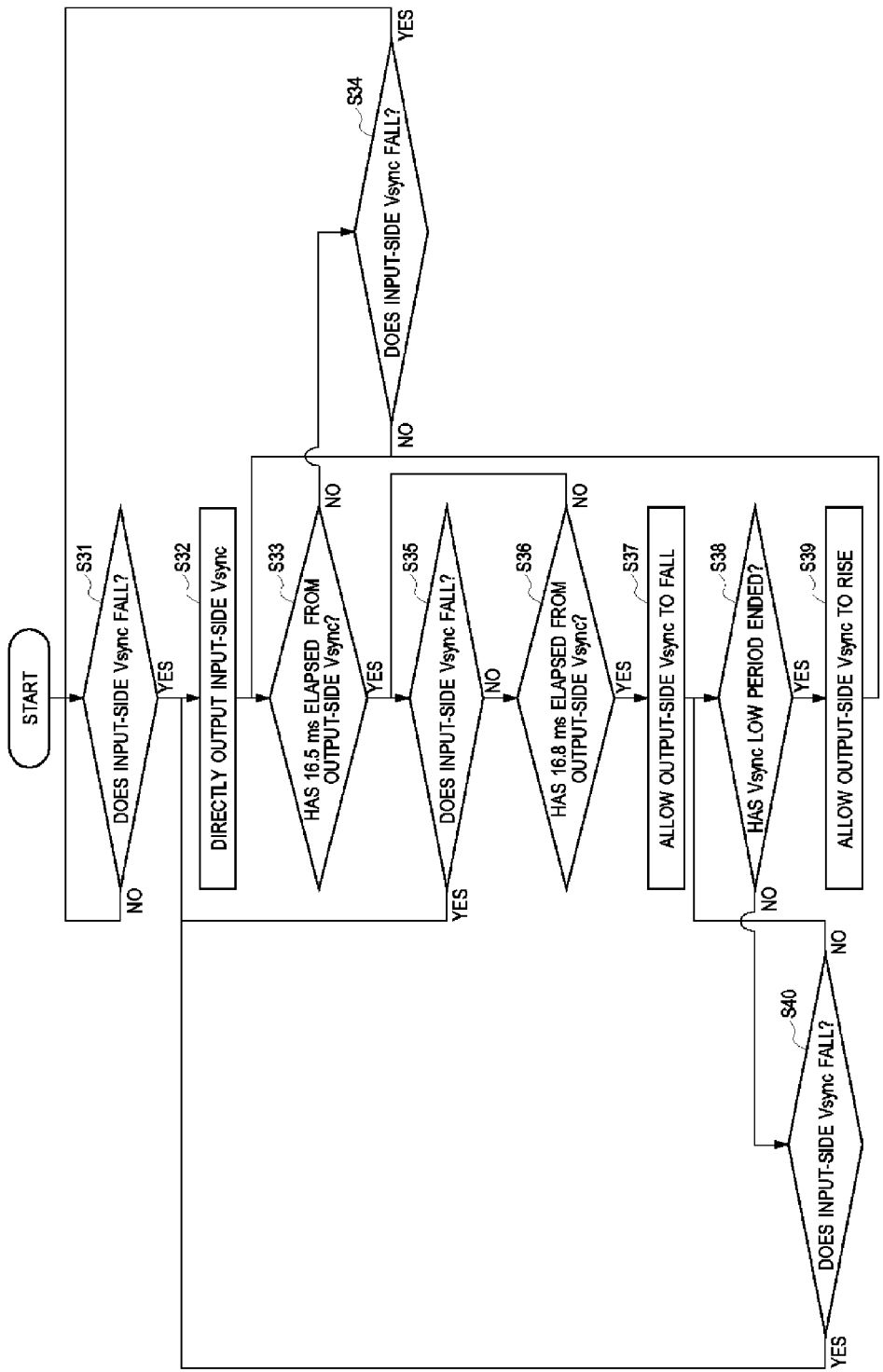
FIG. 3 is a flowchart of the process of outputting an output-side vertical synchronization signal that is performed by a video processing IC according to an embodiment of the present invention.
Figure 4:
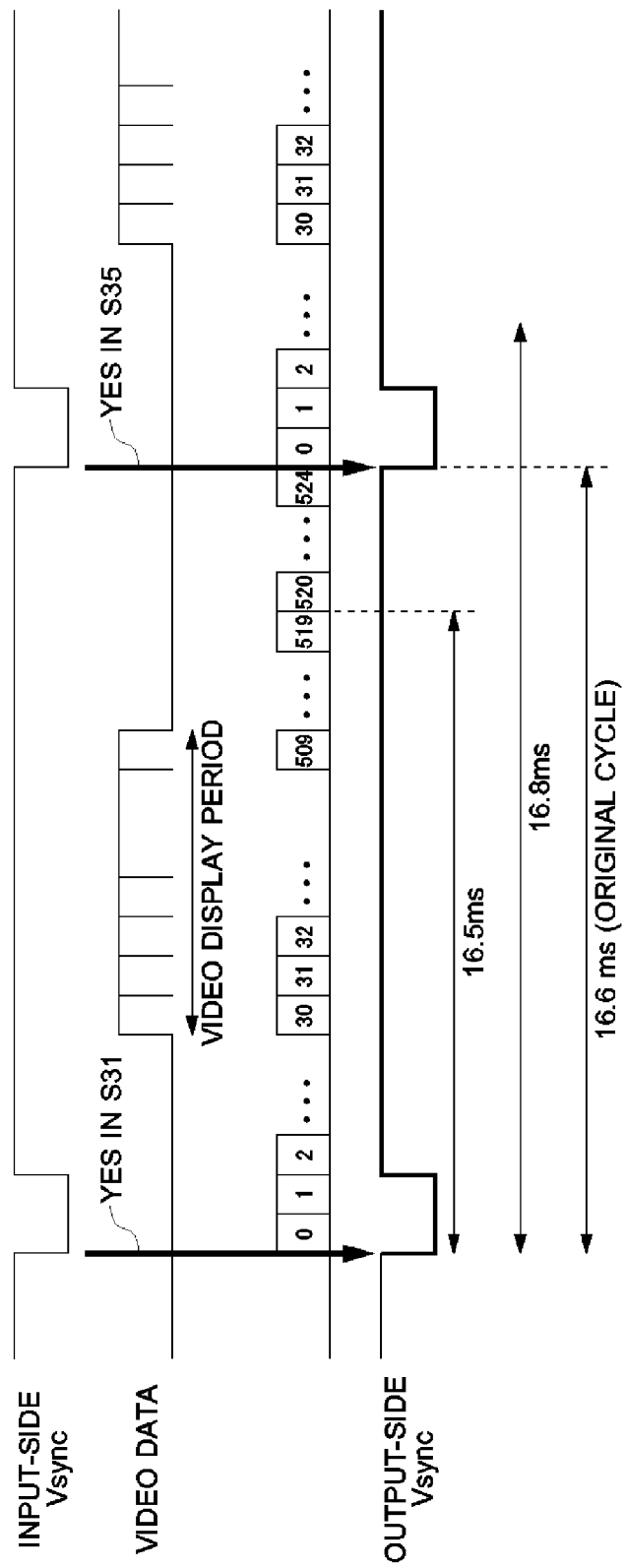
FIG. 4 is a timing diagram of a case where an input-side vertical synchronization signal is normally input in accordance with an embodiment of the present invention.

Next, the process of outputting the output-side vertical synchronization signal that is performed by the synchronization signal control unit 15 will be described. First, the process of a case where the input-side vertical synchronization signal is normally input will be described with reference to FIGS. 3 and 4. FIG. 3 is a flowchart of the process of outputting the output-side vertical synchronization signal that is performed by the video processing IC 10, and FIG. 4 is a timing diagram of a case where the input-side vertical synchronization signal is normally input.

In this embodiment, an example will be described in which the frame rate of an input video signal is 60 Hz, and thus, the input-side vertical synchronization signal is input at 60 Hz. The cycle of the input-side vertical synchronization signal in that case is 16.6 milliseconds. In addition, it is assumed that there are 480 lines in the video signal. In this embodiment, as illustrated in FIG. 3, a line counter is reset to zero in accordance with the input-side vertical synchronization signal, and video data is input in a video displaying cycle of 480 lines from the 30th line to the 509th line. As illustrated in FIG. 3, the cycle of the input-side vertical synchronization signal in a normal case, which is 16.6 milliseconds, corresponds to a time required for counting 525 lines using the line counter.

When the process starts, the synchronization signal detecting unit 12 waits for the fall of the input-side vertical synchronization signal (Step S31). When the synchronization signal detecting unit 12 detects the fall of the input-side vertical synchronization signal (Yes in Step S31), the synchronization signal control unit 15 resets the counter to zero and directly outputs the input-side vertical synchronization signal, which has been input, to the video processing unit 13 and the communication control unit 14 (Step S32). Next, the synchronization signal control unit 15 determines whether or not 16.5 milliseconds have elapsed after the output-side vertical synchronization signal is output (Step S33).

As described above, in this embodiment, the input-side vertical synchronization signal is input at 60 Hz, and the cycle thereof is 16.6 milliseconds. Thus, in this embodiment, in order to check whether or not a next input-side vertical synchronization signal is input earlier than the original cycle, the synchronization signal control unit 15 determines whether or not there is a fall of the input-side vertical synchronization signal (Step S34) until 16.5 milliseconds elapses after the output-side vertical synchronization signal is output (No in Step S33).

When there is no fall of a next input-side vertical synchronization signal that is earlier than that of a normal case (No in Step S34), and 16.5 milliseconds have elapsed after the output of the output-side vertical synchronization signal (No in Step S33 and No in Step S34 are repeated, and Yes in Step S33), the process proceeds to Step S35, and the synchronization signal control unit 15 determines whether or not there is a fall of the input-side vertical synchronization signal. In a case where there is no fall of the input-side vertical synchronization signal (No in Step S35), the synchronization signal control unit 15 determines whether or not 16.8 milliseconds have elapsed after the output of the output-side vertical synchronization signal (Step S36). Until 16.8 milliseconds elapses after the output of the output-side vertical synchronization signal (No in Step S36), the process is returned to Step S35, and the synchronization signal control unit 15 determines whether or not there is a fall of the input-side vertical synchronization signal.

In a case where the input-side vertical synchronization signal is normally input, before 16.8 milliseconds elapses after the output of the output-side vertical synchronization signal (without being Yes in Step S36), a fall of the input-side vertical synchronization signal is detected by the synchronization signal detecting unit 12 (Yes in Step S35). In such a case, the process is returned to Step S32, and the synchronization signal control unit 15 directly outputs the detected input-side vertical synchronization signal to the video processing unit 13 and the communication control unit 14 as an output-side vertical synchronization signal. Subsequently, while the input-side vertical synchronization signal continues to be normally input, similarly to the description presented above, the process is repeated in which Steps S33 and S34 are repeated, when Yes in Step S33, the process proceeds to Step S35, Steps S35 and S36 are repeated, and when Yes in Step S35, the process is returned to Step S32.

Figure 5:
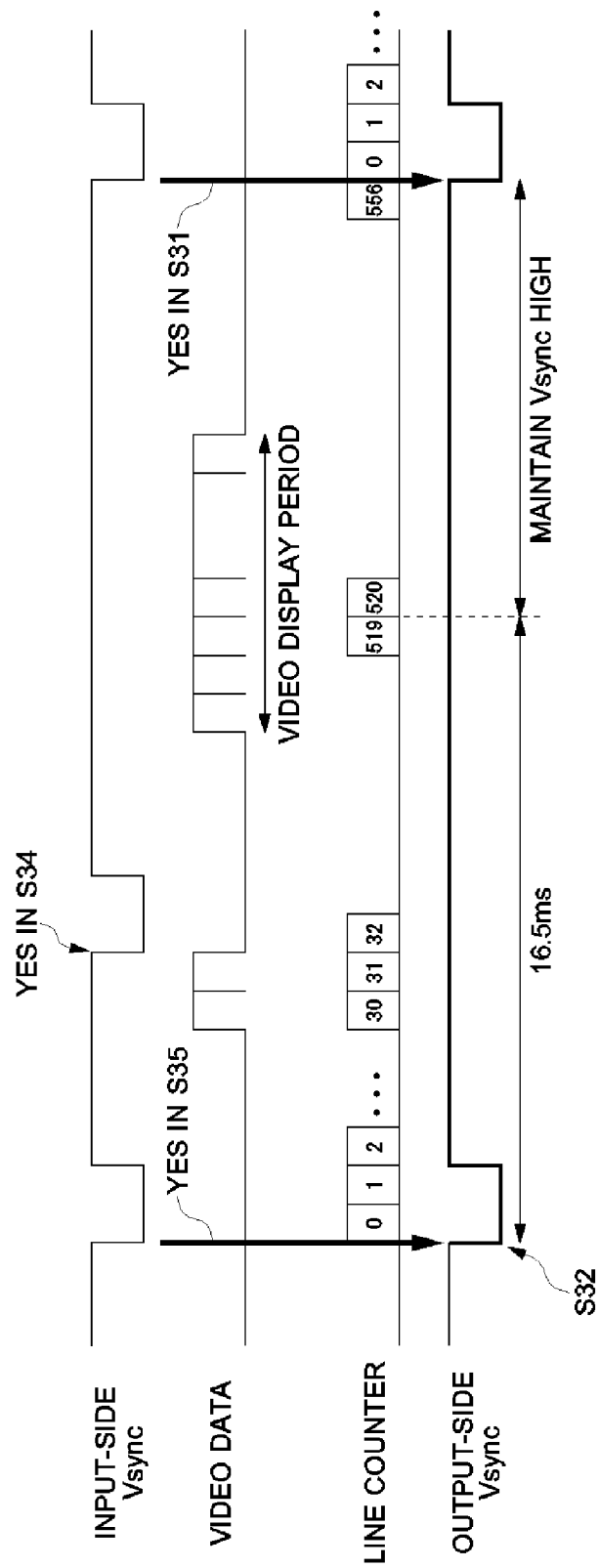
FIG. 5 is a timing diagram of a case where, after an input-side vertical synchronization signal is input, a next new input-side vertical synchronization signal is input without waiting for the cycle in accordance with an embodiment of the present invention.

Next, the process of a case where, after an input-side vertical synchronization signal is input, a next new input-side vertical synchronization signal is input without waiting for the cycle will be described with reference to FIGS. 3 and 5. FIG. 5 is a timing diagram of the case where, after an input-side vertical synchronization signal is input, a next new input-side vertical synchronization signal is input without waiting for the cycle. Such a situation, for example, may occur at a moment when there is switching between input sources of the video signal or switching between video modes.

In a situation in which the input-side vertical synchronization signal is normally input, as described above, Steps S32 to S36 are repeated. Then, when an input-side vertical synchronization signal that is earlier than the original cycle is input, in Step S33, before 16.5 milliseconds elapses after the output of the output-side vertical synchronization signal (No in Step S33), a fall of the input-side vertical synchronization signal is detected by the synchronization signal detecting unit 12 (Yes in Step S34). In such a case, the synchronization signal control unit 15 maintains the output-side vertical synchronization signal at a high level, proceeds to Step S31, and waits for a fall of a next new input-side vertical synchronization signal. When the new input-side vertical synchronization signal is detected by the synchronization signal detecting unit 12 (Yes in Step S31), the synchronization signal control unit 15 resets the counter to zero and, similarly to the description presented above, Steps S32 to S35 are repeated.

By performing as such, even in a case where there is an input of a new input-side vertical synchronization signal before the elapse of 16.5 milliseconds after the output of the output-side vertical synchronization signal, the synchronization signal control unit 15 ignores the input and maintains the output-side vertical synchronization signal at the high level even when 16.6 milliseconds elapses (when the line counter exceeds 525) after the output of the output-side vertical synchronization signal until there is an input of a next input-side vertical synchronization signal. From this, the output-side vertical synchronization signal does not fall in the video display period, and a disturbance of the display does not occur, whereby the display is stable. In addition, even in a case where the communication control unit 14 controls the communication with the microcomputer using the output-side vertical synchronization signal, the communication is maintained to be stable.

Figure 6:
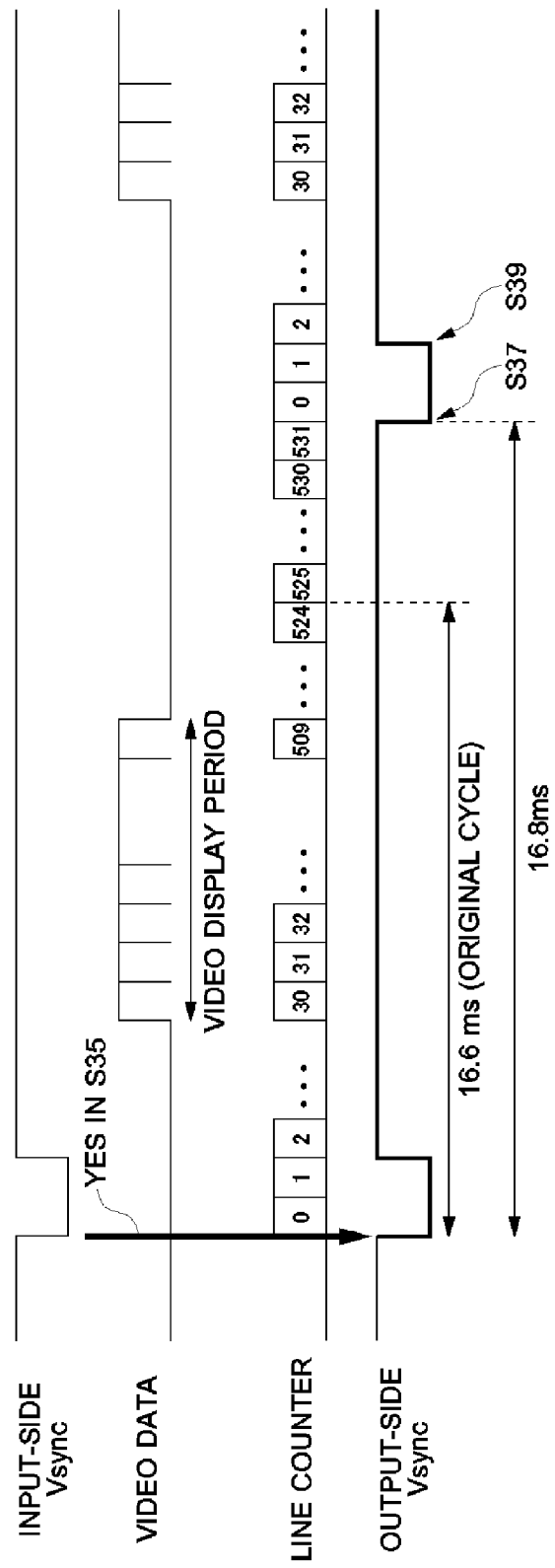
FIG. 6 is a timing diagram of a case where, after an input-side vertical synchronization signal is input, a next new input-side vertical synchronization signal is not input even when the cycle thereof is over in accordance with an embodiment of the present invention.

Next, the process of a case where, after an input-side vertical synchronization signal is input, a next new input-side vertical synchronization signal isnot input even when the cycle is over will be described with reference to FIGS. 3 and 6. FIG. 6 is a timing diagram of a case where, after an input-side vertical synchronization signal is input, a next new input-side vertical synchronization signal isnot input even when the cycle is over. In a situation in which the input-side vertical synchronization signal is normally input, as described above, Steps S32 to S36 are repeated. When a fall of the input-side vertical synchronization signal is not detected even when the original cycle (16.6 milliseconds) is over, and 16.8 milliseconds elapses after the output of the previous output-side vertical synchronization signal (Yes in Step S36), the synchronization signal control unit 15 spontaneously allows the output-side vertical synchronization signal to fall regardless of the input-side vertical synchronization signal and resets the counter to zero (Step S37).

Then, the synchronization signal control unit 15 determines whether or not the low period of the vertical synchronization signal has ended (Step S38), and, when the low period of the vertical synchronization signal has ended (Yes in Step S38), the synchronization signal control unit 15 spontaneously allows the fallen output-side vertical synchronization signal to rise (Step S39), and the process is returned to Step S33. In addition, until the low period of the vertical synchronization signal ends after the synchronization signal control unit 15 spontaneously allows the output-side vertical synchronization signal to fall (No in Step S38), it is determined whether or not a fall of the input-side vertical synchronization signal has been detected by the synchronization signal detecting unit 12 therebetween (Step S40), and, in a case where the fall of the input-side vertical synchronization signal has been detected (Yes in Step S40), the process is returned to Step S32, and the detected input-side vertical synchronization signal is directly output to the video processing unit 13 and the communication control unit 14 as an output-side vertical synchronization signal.

As above, according to this embodiment, in a case where the input-side vertical synchronization signal is input earlier than the original cycle, the input-side vertical synchronization signal is not directly output but is output after waiting for a next input-side vertical synchronization signal, and, in a case where an input-side vertical synchronization signal is not input even when the original cycle is over, an output-side vertical synchronization signal is spontaneously generated, whereby a video can be stably displayed, and the communication can be stabilized even in a case where the communication control unit 14 controls the communication with the microcomputer 20 using the output-side vertical synchronization signal.

The present invention is not limited to the above-described embodiment, and the embodiment may be changed so as to have only a part of above-described functions or have an additional function. Hereinafter, modified examples of the above-described embodiment will be described.

FIRST MODIFIED EXAMPLE

In the above-described embodiment, as a countermeasure for a case where there is no fall of the next input-side vertical synchronization signal (No in Step S36) until 16.8 milliseconds elapses after the output of the output-side vertical synchronization signal, the synchronization signal control unit 15 spontaneously allows the output-side vertical synchronization signal to fall. However, as above, in a case where only a case in which the input-side vertical synchronization signal is input earlier than the original cycle is considered without considering a case where the next input-side vertical synchronization signal does not fall even when the original cycle is over after the output of the output-side vertical synchronization signal, the process of Step S36 and subsequent steps is unnecessary. Thus, in a first modified example, a process of the video processing IC 10 that can respond to the case where the input-side vertical synchronization signal is input earlier than the original cycle will be described.

Figure 7:
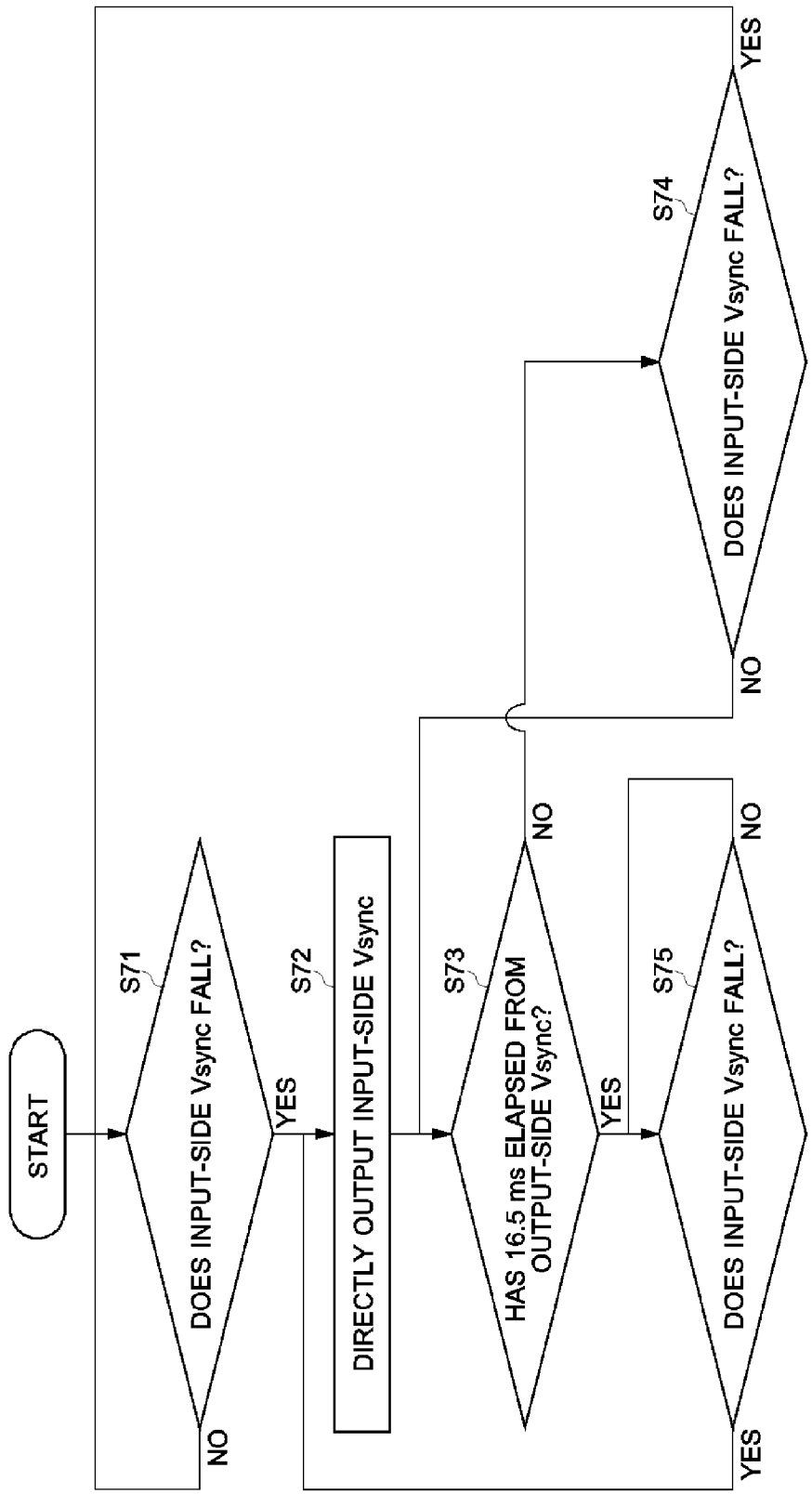
FIG. 7 is a flowchart of a process of outputting an output-side vertical synchronization signal that is performed by a video processing IC according to a first modified example of the embodiment of the present invention.

FIG. 7 is a flowchart of the process of outputting an output-side vertical synchronization signal that is performed by a video processing IC 10 according to the first modified example. As can be understood from a comparison between FIGS. 7 and 3, the flow of the process of outputting the output-side vertical synchronization signal according to the first modified example is configured by only steps corresponding to Steps S31 to S35 of the flow of the process of outputting the output-side vertical synchronization signal according to the above-described embodiment.

When the process starts, the synchronization signal detecting unit 12 waits for a fall of the input-side vertical synchronization signal (Step S71). When the synchronization signal detecting unit 12 detects the fall of the input-side vertical synchronization signal (Yes in Step S71), the synchronization signal control unit 15 resets the counter to zero and directly outputs the input-side vertical synchronization signal, which has been input, to the video processing unit 13 and the communication control unit 14 as an output-side vertical synchronization signal (Step S72). Next, the synchronization signal control unit 15 determines whether or not 16.5 milliseconds have elapsed after the output-side vertical synchronization signal is output (Step S73).

Until 16.5 milliseconds elapses after the output-side vertical synchronization signal is output (No in Step S73), in order to check whether or not a next input-side vertical synchronization signal is input earlier than the original cycle, the synchronization signal control unit 15 determines whether or not there is a fall of the input-side vertical synchronization signal (Step S74).

When there is no fall of a next input-side vertical synchronization signal that is earlier than the original cycle (No in Step S74), and 16.5 milliseconds have elapsed after the output of the output-side vertical synchronization signal (No in Step S73 and No in Step S74 are repeated, and Yes in Step S73), the process proceeds to Step S75, and the synchronization signal control unit 15 waits until there is a fall of the input-side vertical synchronization signal (No in Step S75 is repeated), and in a case where the fall of the input-side vertical synchronization signal is detected (Yes in Step S75), the process is returned to Step S72, and the input-side vertical synchronization signal is directly output to the video processing unit 13 and the communication control unit 14 as an output-side vertical synchronization signal.

In a case where an input-side vertical synchronization signal that is earlier than the original cycle is input, before 16.5 milliseconds elapses after the output of the output-side vertical synchronization signal (No in Step S73), a fall of the input-side vertical synchronization signal is detected by the synchronization signal detecting unit 12 (Yes in Step S74). In such a case, the synchronization signal control unit 15 maintains the output-side vertical synchronization signal at the high level, proceeds to Step S71, and waits for a fall of a next new input-side vertical synchronization signal. When a new input-side vertical synchronization signal is detected by the synchronization signal detecting unit 12 (Yes in Step S71), the synchronization signal control unit 15 resets the counter to zero and, as described above, repeats Steps S72 to S75.

According to this first modified example, even in a case where a new input-side vertical synchronization signal is input before 16.5 milliseconds elapses after the output of the output-side vertical synchronization signal, the synchronization signal control unit 15 ignores the input of the new input-side vertical synchronization signal. In other words, even when 16.6 milliseconds have elapsed after the output of the output-side vertical synchronization signal (even when the line counter exceeds 525), the synchronization signal control unit 15 maintains the output-side vertical synchronization signal at the high level until there is an input of a next input-side vertical synchronization signal. From this, the output-side vertical synchronization signal does not fall in the video display period, and the disturbance of the display does not occur, whereby the display is stabilized. In addition, even in a case where the communication control unit 14 controls the communication with the microcomputer 20 using the output-side vertical synchronization signal, the stability of the communication is maintained.

SECOND MODIFIED EXAMPLE

In the above-described embodiment, as a countermeasure for a case where a fall of the next input-side vertical synchronization signal has been detected (No in Step S36) until 16.5 milliseconds elapses after the output of the output-side vertical synchronization signal, that is a case where the input-side vertical synchronization signal is input earlier than the original cycle, the synchronization signal control unit 15 ignores such a too-early input-side vertical synchronization signal and maintains the output-side vertical synchronization signal at the high level until a next input-side vertical synchronization signal is input. However, as above, in a case where only a case in which a next input-side vertical synchronization signal does not fall even when the original cycle is over after the output of the output-side vertical synchronization signal is considered without considering a case where the input-side vertical synchronization signal is input earlier than the original cycle, the process of Steps S33 and S34 is unnecessary. Thus, in a second modified example, a process of the video processing IC 10 that can respond to the case where a fall of a next input-side vertical synchronization signal is not detected even when the original cycle is over after the output of the output-side vertical synchronization signal will be described.

Figure 8:
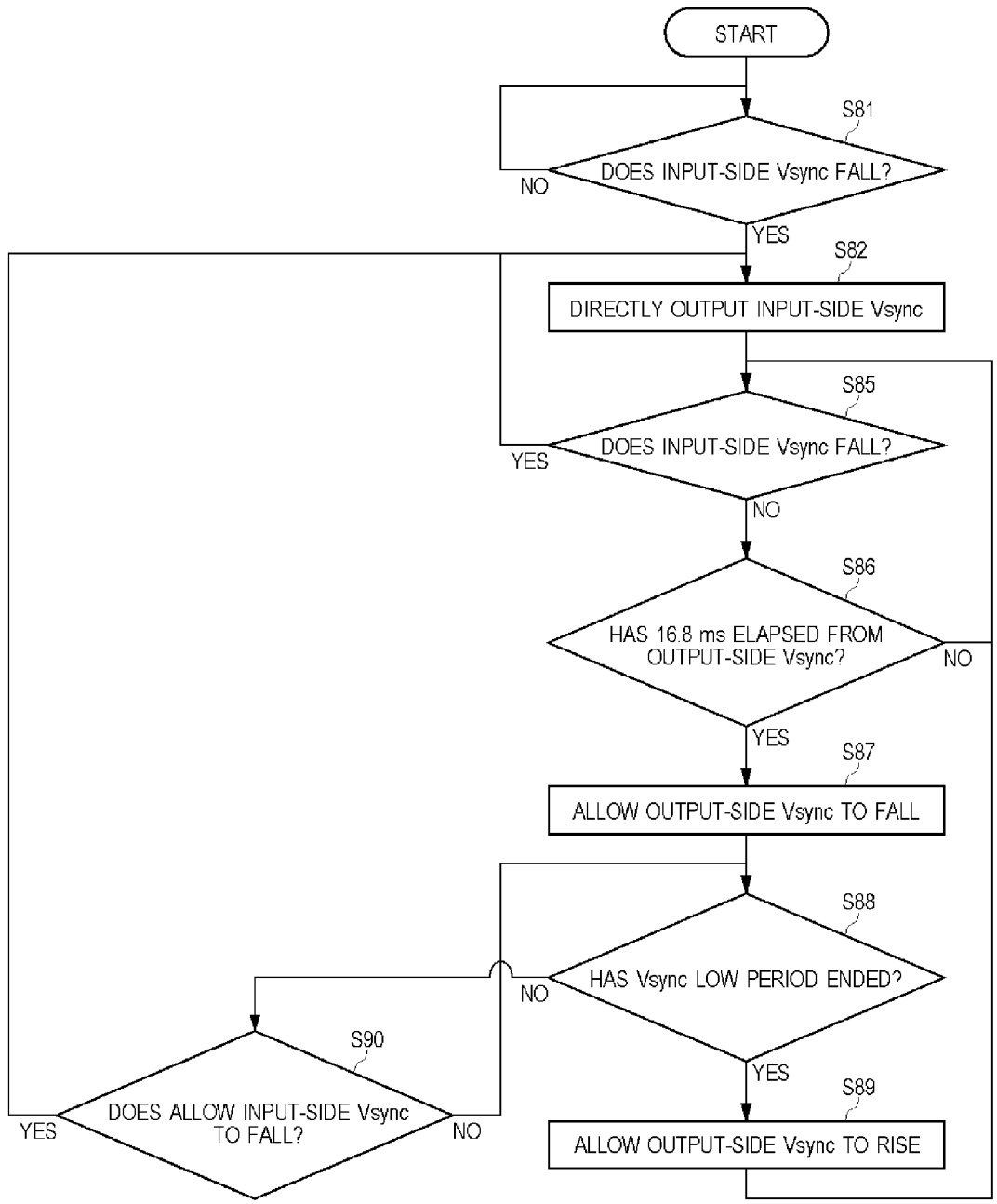
FIG. 8 is a flowchart of a process of outputting an output-side vertical synchronization signal that is performed by a video processing IC according to a second modified example of the embodiment of the present invention.

FIG. 8 is a flowchart of a process of outputting an output-side vertical synchronization signal that is performed by a video processing IC 10 according to the second modified example. As can be understood from a comparison between FIGS. 8 and 3, the flow of the process of outputting the output-side vertical synchronization signal according to the second modified example is configured by steps acquired by excluding Steps S33 and S34 from the flow of the process of outputting the output-side vertical synchronization signal according to the above-described embodiment.

When the process starts, the synchronization signal detecting unit 12 waits for a fall of the input-side vertical synchronization signal (Step S81). When the synchronization signal detecting unit 12 detects the fall of the input-side vertical synchronization signal (Yes in Step S81), the synchronization signal control unit 15 resets the counter to zero and directly outputs the input-side vertical synchronization signal, which has been input, to the video processing unit 13 and the communication control unit 14 as an output-side vertical synchronization signal (Step S82).

Next, the synchronization signal control unit 15 determines whether or not there is a fall of the input-side vertical synchronization signal (Step S85). In a case where there is no fall of the input-side vertical synchronization signal, the synchronization signal control unit 15 determines whether or not 16.8 milliseconds have elapsed after the output of the output-side vertical synchronization signal (Step S86). Until 16.8 milliseconds elapses after the output of the output-side vertical synchronization signal (No in Step S86), the process is returned to Step S85, and the synchronization signal control unit 15 determines whether or not there is a fall of input-side vertical synchronization signal.

In a case where the input-side vertical synchronization signal is normally input, before 16.8 milliseconds elapses after the output of the output-side vertical synchronization signal (without being Yes in Step S86), a fall of the input-side vertical synchronization signal is detected by the synchronization signal detecting unit 12 (Yes in Step S85). In such a case, the process is returned to Step S82, and the synchronization signal control unit 15 directly outputs the detected input-side vertical synchronization signal to the video processing unit 13 and the communication control unit 14 as an output-side vertical synchronization signal and resets the counter to zero. Subsequently, while the input-side vertical synchronization signal continues to be normally input, similarly to the description presented above, the process is repeated in which Steps S85 and S38 are repeated, when Yes in Step S85, the process is returned to Step S82, and the counter is reset to zero.

After the input-side vertical synchronization signal is directly output as the output-side vertical synchronization signal in Step S82, when a fall of the input-side vertical synchronization signal has not been detected even when the original cycle (16.6 milliseconds) is over, and 16.8 milliseconds elapses from the output of the previous output-side vertical synchronization signal (Yes in Step S86), the synchronization signal control unit 15 spontaneously allows the output-side vertical synchronization signal to fall regardless of the input-side vertical synchronization signal and resets the counter to zero (Step S87).

Then, the synchronization signal control unit 15 determines whether or not the low period of the vertical synchronization signal has ended (Step S88), and, when the low period of the vertical synchronization signal has ended (Yes in Step S88), the synchronization signal control unit 15 spontaneously allows the fallen output-side vertical synchronization signal to rise (Step S89), and the process is returned to Step S85. In addition, until the low period of the vertical synchronization signal ends after the spontaneous fall of the output-side vertical synchronization signal (No in Step S88), the synchronization signal control unit 15 determines whether or not a fall of the input-side vertical synchronization signal has been detected by the synchronization signal detecting unit 12 therebetween (Step S90), and, in a case where the fall of the input-side vertical synchronization signal has been detected (Yes in Step S90), the process is returned to Step S82, and the detected input-side vertical synchronization signal is directly output to the video processing unit 13 and the communication control unit 14 as an output-side vertical synchronization signal.

According to this second modified example, in a case where the input-side vertical synchronization signal has not been input even when the original cycle is over, the synchronization signal control unit 15 spontaneously generates the output-side vertical synchronization signal, and accordingly, a video can be displayed on the display 30 in a stable manner, and, also in a case where the communication control unit 14 controls the communication with the microcomputer 20 using the output-side vertical synchronization signal, the communication can be stabilized.

THIRD MODIFIED EXAMPLE

In a third modified example, a function is added to the first modified example. In the embodiment and the first modified example thereof described above, while a case where the input-side vertical synchronization signal is input earlier than the original cycle can be appropriately responded, in the third modified example, additionally, a case where the input-side vertical synchronization signal is disturbed (for example, a case in which the input-side vertical synchronization signal violently repeats to be at the high level and the low level) can be appropriately responded.

Figure 9:
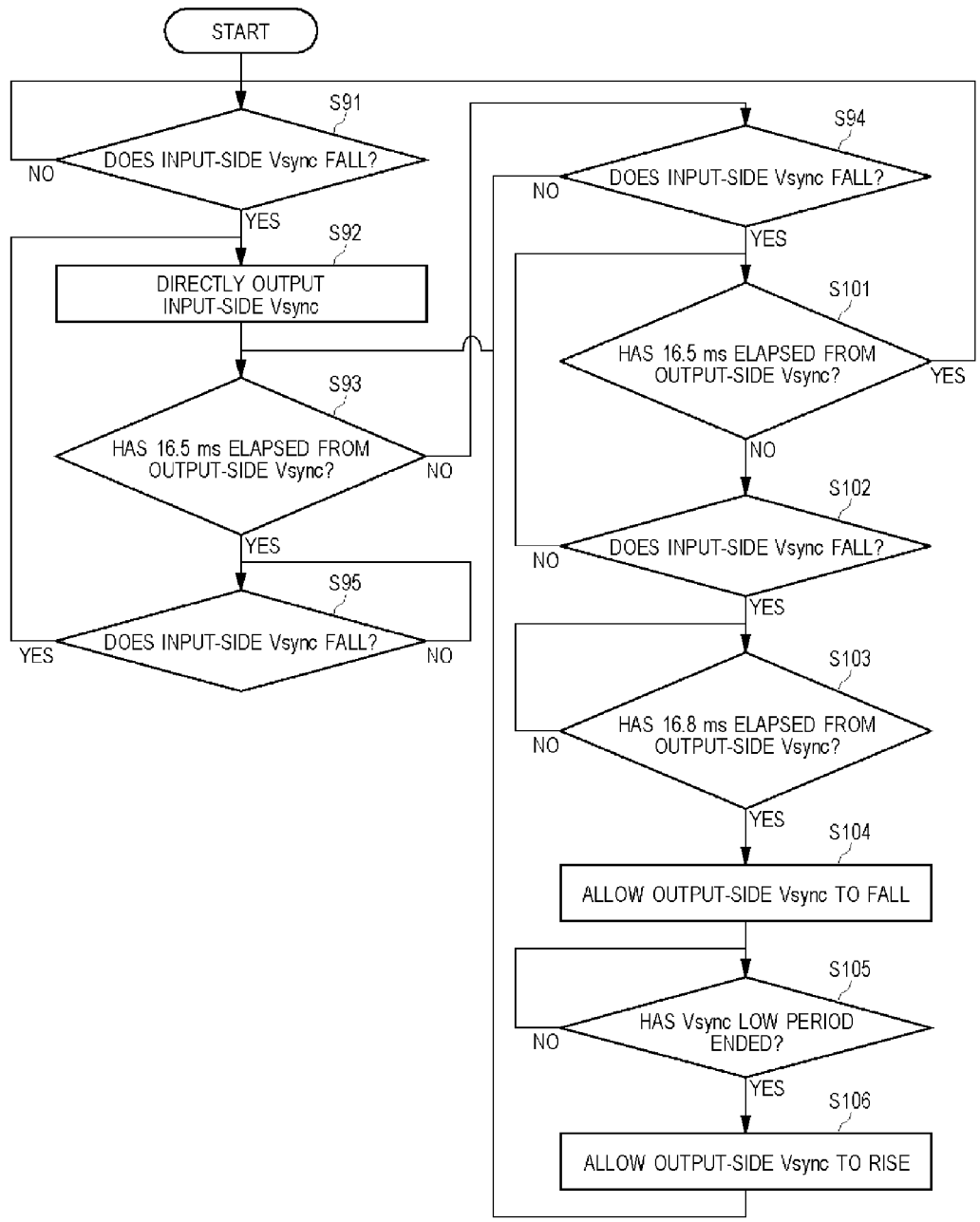
FIG. 9 is a flowchart of a process of outputting an output-side vertical synchronization signal that is performed by a video processing IC according to a third modified example of the embodiment of the present invention.
Figure 10:
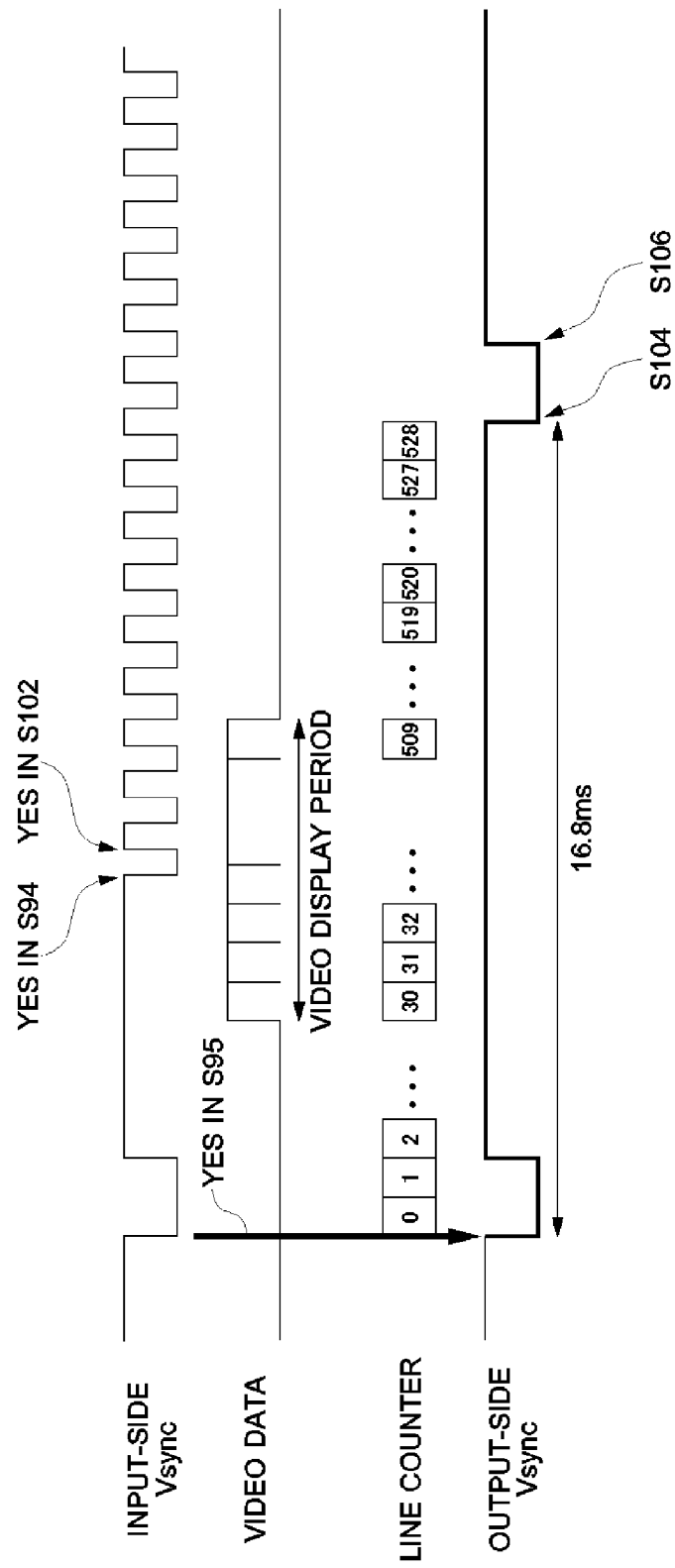
FIG. 10 is a timing diagram of a case where an input-side vertical synchronization signal is disturbed in the third modified example of the embodiment of the present invention.

FIG. 9 is a flowchart of a process of outputting an output-side vertical synchronization signal that is performed by a video processing IC 10 according to the third modified example. FIG. 10 is a timing diagram of a case where an input-side vertical synchronization signal is disturbed. As can be understood from a comparison between FIGS. 9 and 7, the flow of the process of outputting the output-side vertical synchronization signal according to the third modified example is configured by adding the flow of Steps S101 to S106 to the flow of the process of outputting the output-side vertical synchronization signal according to the first modified example.

When the process starts, the synchronization signal detecting unit 12 waits for a fall of the input-side vertical synchronization signal (Step S91). When the synchronization signal detecting unit 12 detects the fall of the input-side vertical synchronization signal (Yes in Step S91), the synchronization signal control unit 15 resets the counter to zero and directly outputs the input-side vertical synchronization signal, which has been input, to the video processing unit 13 and the communication control unit 14 as an output-side vertical synchronization signal (Step S92). Next, the synchronization signal control unit 15 determines whether or not 16.5 milliseconds have elapsed after the output-side vertical synchronization signal is output (Step S93).

Until 16.5 milliseconds elapses after the output-side vertical synchronization signal is output (No in Step S93), in order to check whether or not a next input-side vertical synchronization signal is input earlier than the original cycle, the synchronization signal control unit 15 determines whether or not there is a fall of the input-side vertical synchronization signal (Step S94).

When there is no fall of a next input-side vertical synchronization signal that is earlier than the original cycle (No in Step S94), and 16.5 milliseconds have elapsed after the output of the output-side vertical synchronization signal (No in Step S93 and No in Step S94 are repeated, and Yes in Step S93), the process proceeds to Step S95, and the synchronization signal control unit 15 waits until there is a fall of the input-side vertical synchronization signal (No in Step S95 is repeated), and in a case where the fall of the input-side vertical synchronization signal is detected (Yes in Step S95), the process is returned to Step S92, and the input-side vertical synchronization signal is directly output to the video processing unit 13 and the communication control unit 14 as an output-side vertical synchronization signal.

In a case where an input-side vertical synchronization signal that is earlier than the original cycle is input, before 16.5 milliseconds elapses after the output of the output-side vertical synchronization signal (No in Step S93), a fall of the input-side vertical synchronization signal is detected by the synchronization signal detecting unit 12 (Yes in Step S94). In the embodiment and the first modified example thereof described above, thereafter, the process is returned to Steps S31 and S71, waiting for a next input-side vertical synchronization signal is performed, and, when the input-side vertical synchronization signal is input (Yes in Steps S31 and S71), the input-side vertical synchronization signal is directly output as an output-side vertical synchronization signal (Steps S32 and S72), and, in that case, as illustrated in FIG. 10, in a case where there is a second fall of the input-side vertical synchronization signal before the elapse of 16.5 milliseconds after the output of the output-side vertical synchronization signal from the synchronization signal control unit 15, the second input-side vertical synchronization signal is directly output in Steps S32 and S72.

Thus, in a third modified example, in a case where there is a fall of the second input-side vertical synchronization signal before 16.5 milliseconds elapses after the output of the output-side vertical synchronization signal due to the disturbance of the input-side vertical synchronization signal, second and subsequent input-side vertical synchronization signals are ignored. Accordingly, in the third modified example, in a case where a fall of the input-side vertical synchronization signal is detected (Yes in Step S94) before 16.5 milliseconds elapses (No in Step S93) after the output of the output-side vertical synchronization signal, the synchronization signal control unit 15 continuously outputs the output-side vertical synchronization signal and then determines whether or not 16.5 milliseconds have elapsed (Step S101).

Until 16.5 milliseconds elapses after the output of the output-side vertical synchronization signal (No in Step S101), the synchronization signal control unit 15 determines whether or not there is a fall of the second input-side vertical synchronization signal (Step S102). In a case where there is no fall of the second input-side vertical synchronization signal, and 16.5 milliseconds have elapsed after the output of the output-side vertical synchronization signal (Yes in Step S101), the situation is the same as that illustrated in FIG. 5, and accordingly, the process is returned to Step S91, and the synchronization signal control unit 15 waits for a fall of the next input-side vertical synchronization signal.

On the other hand, in a case where there is a fall of the second input-side vertical synchronization signal until 16.5 milliseconds elapses after the output of the output-side vertical synchronization signal (Yes in Step S102), waiting for the elapse of 16.8 milliseconds after the output of the output-side vertical synchronization signal (after being No in Step S103 is repeated, Yes), and the synchronization signal control unit 15 spontaneously allows the output-side vertical synchronization signal to fall (Step S104). In addition, after the second input-side vertical synchronization signal is input in Step S102, while waiting for the elapse of 16.8 milliseconds is performed after the output of the output-side vertical synchronization signal in Step S103, even in a case where falls of the third, fourth, . . . input-side vertical synchronization signals are detected, the synchronization signal control unit 15 ignores the falls of the input-side vertical synchronization signals, waits for the elapse of 16.8 milliseconds after the output of the output-side vertical synchronization signal, and allows the output-side vertical synchronization signal to fall in Step S104.

After the output-side vertical synchronization signal falls in Step S104, the synchronization signal control unit 15 waits for the end of the low period of the vertical synchronization signal (after being No in Step S105 is repeated, Yes) and allows the output-side vertical synchronization signal to rise (Step S106), and the process is returned to Step S93.

According to the third modified example, even in a case where the input-side vertical synchronization signal is disturbed to violently repeat to be at the high level and the low level, when an input-side vertical synchronization signal is input earlier than the original cycle, and a second early input-side vertical synchronization signal is detected, the input-side vertical synchronization signal is ignored thereafter until the original cycle elapses, and accordingly, as illustrated in FIG. 10, the output-side vertical synchronization signal does not fall in the video display period, a video can be stably displayed, and the communication can be stabilized even in a case where the microcomputer 20 performs communication using the output-side vertical synchronization signal.

FOURTH MODIFIED EXAMPLE

Figure 11:
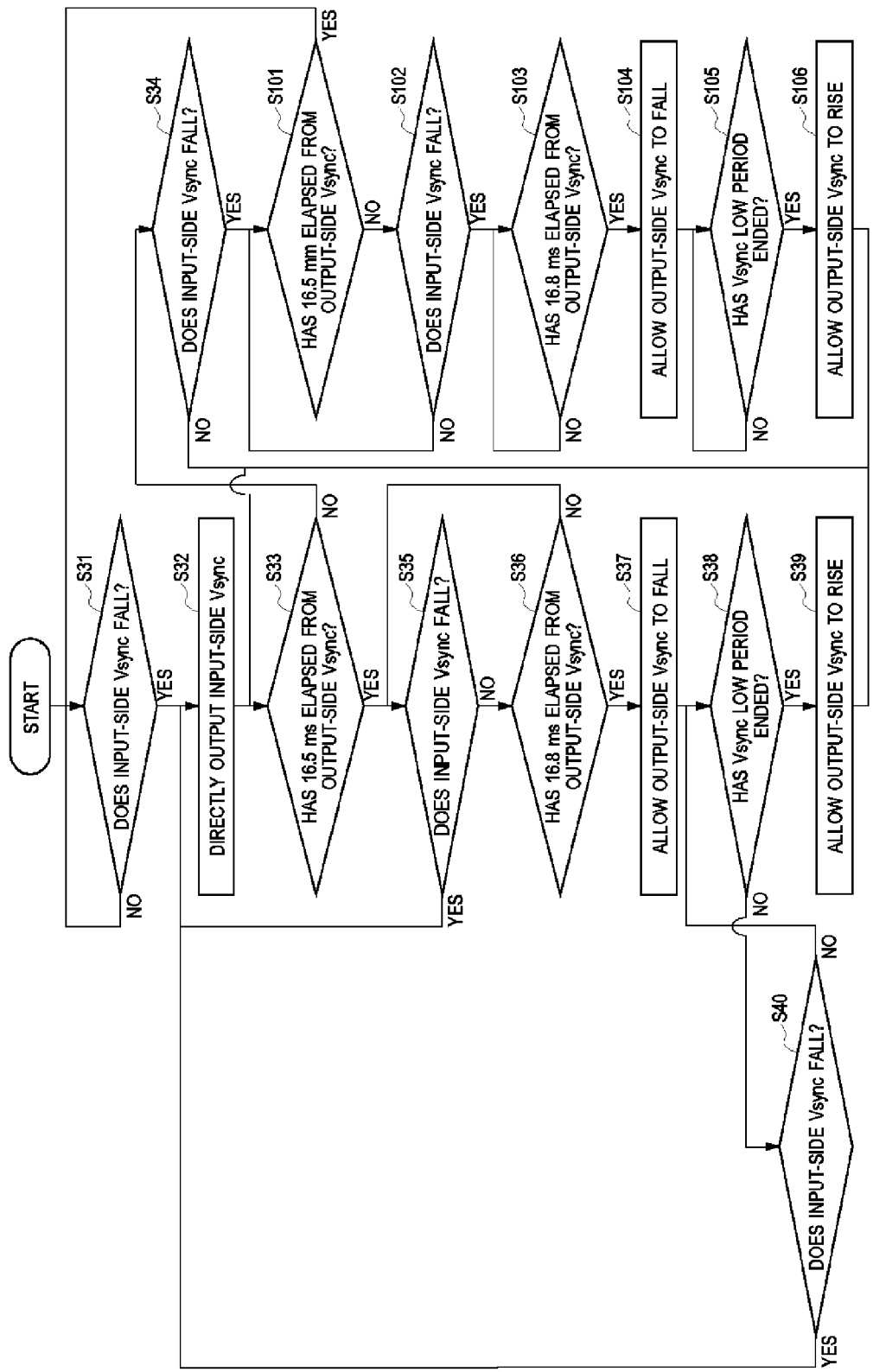
FIG. 11 is a flowchart of a process of outputting an output-side vertical synchronization signal that is performed by a video processing IC according to a fourth modified example of the embodiment of the present invention.
Figure 12:
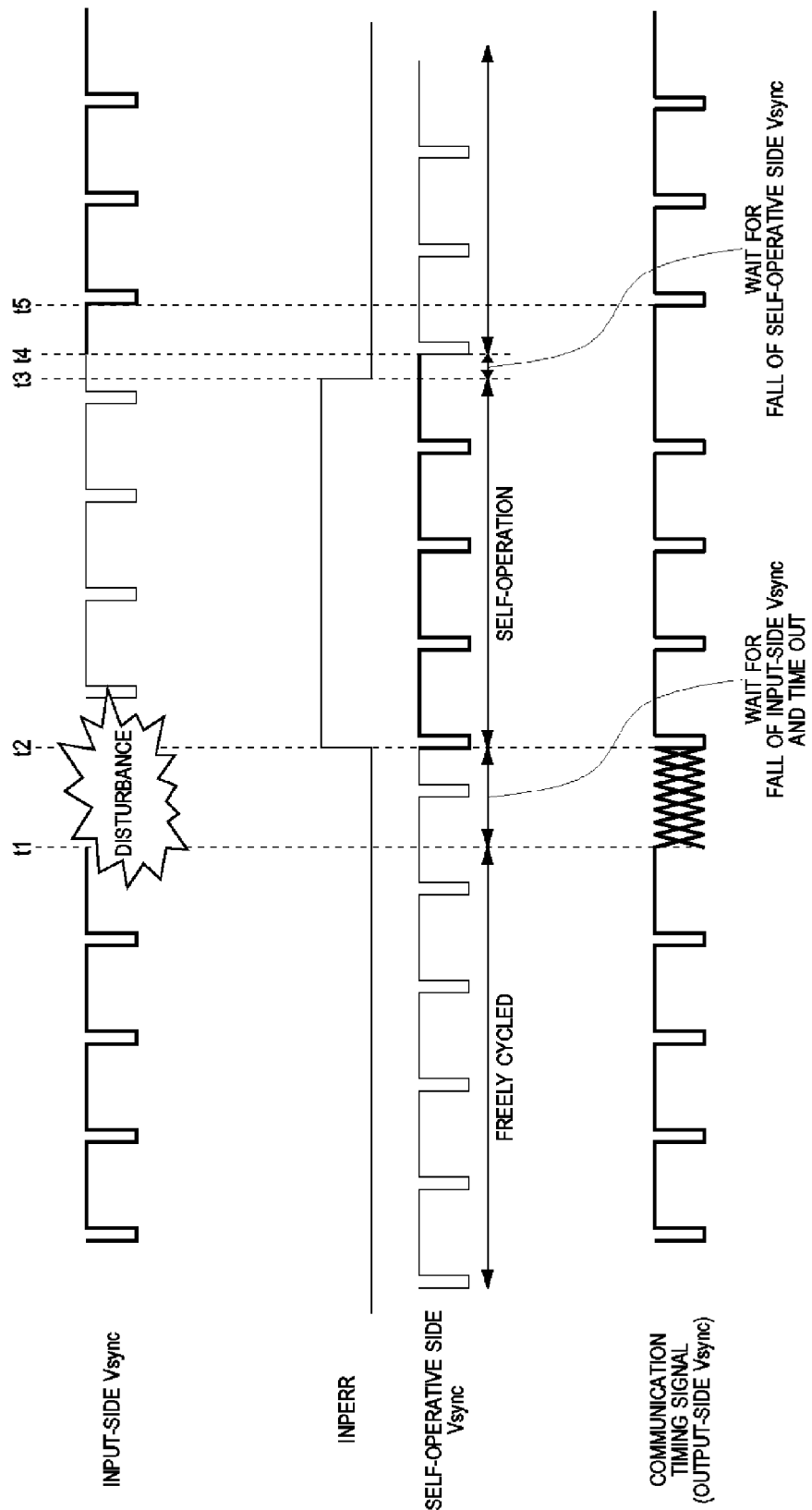
FIG. 12 is a timing diagram that illustrates the relation between an input vertical synchronization signal and an output communication timing signal according to a conventional video processing device.

FIG. 11 is a flowchart of a process of outputting an output-side vertical synchronization signal that is performed by a video processing IC 10 according to a fourth modified example. In the third modified example, while the function for responding to the disturbance of the input-side vertical synchronization signal is added to the process of outputting the output-side vertical synchronization signal according to the first modified example, in the fourth modified example, a function of responding to the disturbance of the input-side vertical synchronization signal is added to the process of outputting the output-side vertical synchronization signal according to the above-described embodiment. Thus, in the flowchart illustrated in FIG. 11, the same reference numeral is assigned to the same process as that of the above-described embodiment illustrated in FIG. 3, and the same reference numeral is assigned to the same process as that of the third modified example illustrated in FIG. 9. The process of each step is as described in the embodiment and the third modified example described above, and thus the description thereof will not be presented.

According to the fourth modified example, as illustrated in FIG. 5, to a case where the input-side vertical synchronization signal is input earlier than the original cycle due to switching between input sources of videos or the like, as illustrated in FIG. 6, a case where the input-side vertical synchronization signal has not been input even when the original cycle is over, and, as illustrated in FIG. 10, a case where the input-side vertical synchronization signal is disturbed, the synchronization signal control unit 15 immediately responds and ignores the input-side vertical synchronization signal or spontaneously outputs the output-side vertical synchronization signal as is necessary, and accordingly, a video can be stably displayed, and the communication can be stabilized even in a case where the communication control unit 14 controls communication with the microcomputer 20 using the output-side vertical synchronization signal.

In the above-embodiment, while an example has been described in which the communication control unit 14 directly uses the output-side vertical synchronization signal output by the synchronization signal control unit 15 as a communication timing signal used for communication with the microcomputer 20, the video processing IC 10 may further include a communication timing signal generating unit generating a communication timing signal based on the output-side vertical synchronization signal output by the synchronization signal control unit 15, and the communication control unit 14 may use this communication timing signal for the communication with the microcomputer 20. In such a case, the communication timing signal has the same cycle as that of the output-side vertical synchronization signal and is a signal that is processed (for example, processed to shift the phase) based on the output-side vertical synchronization signal.

While the preferred embodiment of the present invention, which is considered at the current time point, has been described, this embodiment may be variously changed, and all such changes within the true spirit and the scope of the present invention are intended to be included in the attached claims.

Industrial Applicability

As above, the present invention has an advantage of being capable of reducing the influence of a disturbance of the input-side vertical synchronization signal and is useful as a video processing device performing communication for displaying a video or controlling video processing using a vertical synchronization signal or the like.

Reference Signs List

10 video processing IC
   11 video inputting unit
   12 synchronization signal detecting unit
   13 video processing unit
   14 communication control unit
   15 synchronization signal control unit
   20 microcomputer
   30 display
   100 video display device

The invention claimed is:

1. A video processing device comprising:
a video inputting unit that receives video data and an input-side vertical synchronization signal used for displaying the video data as inputs;
a synchronization signal detecting unit that detects an input of the input-side vertical synchronization signal to the video inputting unit; and
a synchronization signal control unit that outputs an output-side vertical synchronization signal based on a detection result acquired by the synchronization signal detecting unit,
wherein the synchronization signal control unit outputs the input-side vertical synchronization signal, which has been input, as the output-side vertical synchronization signal when the synchronization signal detecting unit detects an input of the input-side vertical synchronization signal at a predetermined cycle, and
when the synchronization signal detecting unit detects an input of the next input-side vertical synchronization signal before the predetermined cycle elapses after the output of the output-side vertical synchronization signal, the synchronization signal control unit does not output a next input-side vertical synchronization signal input before an elapse of the predetermined cycle as a next output-side vertical synchronization signal but outputs an input-side vertical synchronization signal that is input further next as the next output-side vertical synchronization signal.

2. The video processing device according to claim 1, wherein, when the synchronization signal detecting unit has not detected an input of the next input-side vertical synchronization signal even when the predetermined cycle is over after the output of the output-side vertical synchronization signal, the synchronization signal control unit outputs the next output-side vertical synchronization signal when the predetermined cycle is over.

3. A video processing device comprising:
a video inputting unit that receives video data and an input-side vertical synchronization signal used for displaying the video data as inputs;
a synchronization signal detecting unit that detects an input of the input-side vertical synchronization signal to the video inputting unit; and
a synchronization signal control unit that outputs an output-side vertical synchronization signal based on a detection result acquired by the synchronization signal detecting unit,
wherein the synchronization signal control unit outputs the input-side vertical synchronization signal, which has been input, as the output-side vertical synchronization signal when the synchronization signal detecting unit detects an input of the input-side vertical synchronization signal at a predetermined cycle, and
when the synchronization signal detecting unit has not detected an input of a next input-side vertical synchronization signal even when the predetermined cycle is over after the output of the output-side vertical synchronization signal, the synchronization signal control unit outputs a next output-side vertical synchronization signal when the predetermined cycle is over.

4. The video processing device according to claim 3, wherein the synchronization signal control unit does not output the next input-side vertical synchronization signal as the next output-side vertical synchronization signal when the synchronization signal detecting unit detects an input of the next input-side vertical synchronization signal before the predetermined cycle elapses after the output of the output-side vertical synchronization signal, the synchronization signal control unit, when the synchronization signal detecting unit detects an input of a further next input-side vertical synchronization signal before the predetermined cycle elapses after the output of the output-side vertical synchronization signal, does not output the next output-side vertical synchronization signal until the predetermined cycle elapses after the output of the output-side vertical synchronization signal regardless of an input of an input-side vertical synchronization signal after that, and the synchronization signal control unit outputs the next output-side vertical synchronization signal when the predetermined cycle elapses after the output of the output-side vertical synchronization signal.

5. A video processing device comprising:
a video inputting unit that receives video data and an input-side vertical synchronization signal used for displaying the video data as inputs;
a synchronization signal detecting unit that detects an input of the input-side vertical synchronization signal to the video inputting unit; and
a synchronization signal control unit that outputs an output-side vertical synchronization signal based on a detection result acquired by the synchronization signal detecting unit,
wherein the synchronization signal control unit outputs the input-side vertical synchronization signal, which has been input, as the output-side vertical synchronization signal when the synchronization signal detecting unit detects an input of the input-side vertical synchronization signal at a predetermined cycle, and
the synchronization signal control unit does not output a next input-side vertical synchronization signal as a next output-side vertical synchronization signal when the synchronization signal detecting unit detects an input of the next input-side vertical synchronization signal before the predetermined cycle elapses after the output of the output-side vertical synchronization signal, the synchronization signal control unit, when the synchronization signal detecting unit detects an input of a further next input-side vertical synchronization signal before the predetermined cycle elapses after the output of the output-side vertical synchronization signal, does not output the next output-side vertical synchronization signal until the predetermined cycle elapses after the output of the output-side vertical synchronization signal regardless of an input of an input-side vertical synchronization signal after that, and the synchronization signal control unit outputs the next output-side vertical synchronization signal when the predetermined cycle elapses after the output of the output-side vertical synchronization signal.

6. The video processing device according to claim 1, further comprising a video processing unit that receives the video data input to the video inputting unit as an input and generates display data used for displaying the video data by processing the video data using the output-side vertical synchronization signal output from the synchronization signal control unit.

7. The video processing device according to claim 6, further comprising a communication control unit that performs communication used for controlling video processing in the video processing unit by using a communication timing signal that is based on the output-side vertical synchronization signal output from the synchronization signal control unit.

8. A video display device comprising:
the video processing device according to claim 6; and a display that displays the display data generated by the video processing unit.

9. A video display device comprising:
the video processing device according to claim 7; and
a microcomputer that communicates with the communication control unit and transmits control data used for controlling video processing in the video processing unit to the communication control unit.

10. A method of outputting a synchronization signal, the method comprising:
inputting video data and an input-side vertical synchronization signal used for displaying the video data;
detecting an input of the input-side vertical synchronization signal;
outputting the input-side vertical synchronization signal, which has been input, as an output-side vertical synchronization signal when an input of the input-side vertical synchronization signal is detected at a predetermined cycle in the detecting of an input of the input-side vertical synchronization signal;
not outputting a next input-side vertical synchronization signal as a next output-side vertical synchronization signal but outputting an input-side vertical synchronization signal that is input further next as the next output-side vertical synchronization signal when an input of the next input-side vertical synchronization signal is detected in the detecting of an input of the input-side vertical synchronization signal before the predetermined cycle elapses after the output of the output-side vertical synchronization signal; and
outputting the next output-side vertical synchronization signal when the predetermined cycle is over in a case where an input of the input-side vertical synchronization signal is not detected even when the predetermined cycle is over after the output of the output-side vertical synchronization signal in the detecting of an input of the input-side vertical synchronization signal.

11. A method of outputting a synchronization signal, the method comprising:
inputting video data and an input-side vertical synchronization signal used for displaying the video data;
detecting an input of the input-side vertical synchronization signal;
outputting the input-side vertical synchronization signal, which has been input, as an output-side vertical synchronization signal when an input of the input-side vertical synchronization signal is detected at a predetermined cycle in the detecting of an input of the input-side vertical synchronization signal;
not outputting the next input-side vertical synchronization signal as the next output-side vertical synchronization signal when an input of the next input-side vertical synchronization signal is detected in the detecting of an input of the input-side vertical synchronization signal before the predetermined cycle elapses after the output of the output-side vertical synchronization signal, not outputting the next output-side vertical synchronization signal until the predetermined cycle elapses after the output of the output-side vertical synchronization signal regardless of an input of an input-side vertical synchronization signal thereafter when an input of a further next input-side vertical synchronization signal is detected in the detecting of an input of the input-side vertical synchronization signal before the predetermined cycle elapses after the output of the output-side vertical synchronization signal, and outputting the next output-side vertical synchronization signal when the predetermined cycle elapses after the output of the output-side vertical synchronization signal.

* * * * *